Patented Jan. 17, 1933

1,894,647

UNITED STATES PATENT OFFICE

THEODORE B. WAGNER, OF BROOKLYN, NEW YORK

METAL ORGANIC PHOSPHATE AND PROCESS OF MAKING SAME

No Drawing.    Application filed May 21, 1928.  Serial No. 279,622.

The objects of the present invention are, firstly, to react steepwater of corn with a metal salt, and secondly, to impart to such new compound a maximum content of the metallic constituent.

I have found that if a soluble metallic salt, ferric chloride, for instance, is added to steepwater, a copious whitish precipitate is produced which contains a moderate amount of iron, usually about 8%, calculated as Fe. If, however, I take care to neutralize carefully the mineral acid, in this instance, hydrochloric acid as formed upon the addition of ferric chloride, with a suitable neutralizing agent such as sodium acetate, moreover, if I add the solution of ferric chloride before the sodium acetate is introduced, a precipitate is formed, the iron content of which approaches a maximum amount.

In United States Letters Patent No. 1,434,462, No. 1,680,827 and No. 1,716,286, the method of obtaining steepwater from Indian corn and the chemical composition of such steepwater have been described. It is known from these patents and other references in the prior art, that steepwater has a complex composition and contains valuable ingredients including mineral salts, organic phosphoric acids, and nitrogenous substances, chiefly proteins and amino acids.

Salts of other metals such as manganese, cobalt, bismuth and the like may be produced in an analogous manner and are meant to come within the scope of my invention.

When in the claims I refer to compounds of heavy metals, I mean compounds such as salts of iron, manganese, cobalt, bismuth, or the like wherein the metal is a heavy metal and is not a light metal of the alkaline or alkaline earth groups.

I claim:

1. The process of producing a metallic precipitate from steepwater of corn which comprises adding a soluble salt of a heavy metal of the group consisting of iron, manganese, cobalt and bismuth to such steepwater of corn to form a precipitate, and separating said precipitate from the said steepwater whereby a solid corn product containing said heavy metal is obtained.

2. The process of producing a metallic precipitate from steepwater of corn which comprises adding a soluble salt of a heavy metal of the group consisting of iron, manganese, cobalt and bismuth to such steepwater of corn to form a precipitate containing a heavy metal, adding a neutralizing agent to said steepwater containing the aforesaid precipitate, and separating said precipitate from the steepwater whereby a solid corn product containing said heavy metal is obtained.

3. The process of producing an iron precipitate from steepwater of corn which comprises adding a soluble iron compound to said steepwater of corn to form a copious precipitate, and separating said precipitate from said steepwater whereby a solid corn product containing iron is obtained.

4. The process of producing an iron precipitate from steepwater of corn which comprises adding ferric chloride to said steepwater of corn to form a copious precipitate, and separating said iron precipitate from the steepwater whereby a solid corn product containing iron is obtained.

5. The process of producing an iron precipitate from steepwater of corn which comprises adding ferric chloride to said steepwater of corn to form a copious precipitate, adding sodium acetate to said steepwater containing said precipitate to neutralize acid present in said steepwater mixture, and separating said iron precipitate from the steepwater whereby a solid corn product containing iron is obtained.

6. A corn product composed of a precipitate containing a heavy metal of the group consisting of iron, manganese, cobalt and bismuth which is derived from the steepwater of corn by the addition thereto of a soluble salt of said heavy metal.

7. A corn product composed of a precipitate containing iron which is derived from the steepwater of corn by the addition thereto of a soluble iron compound.

8. A corn product composed of a precipitate containing iron which is derived from the steepwater of corn by the addition thereto of ferric chloride and then the addition of sodium acetate.

THEODORE B. WAGNER.